United States Patent Office 3,058,934
Patented Oct. 16, 1962

3,058,934
COATING COMPOSITIONS CONTAINING 2-VINYL-1,3-CYCLIC ACETAL GROUPS
Carol K. Ikeda, Wallingford, Pa., assignor to E. I. du Pont de Nemours and Company, Wilmington, Del., a corporation of Delaware
No Drawing. Filed May 29, 1958, Ser. No. 738,624
3 Claims. (Cl. 260—22)

This invention relates to coating compositions. More particularly, it relates to liquid coating compositions employing as an essential film-former a class of compounds characterized by containing a plurality of 2-vinyl-1,3-cyclic acetal groups of a kind more specifically defined hereinafter.

The film-forming compounds based on 2-vinyl-1,3-cyclic acetal groups, referred to above, are particularly interesting because they present a new class of compounds suitable for making air drying coating compositions. Many of such compounds are themselves liquid and so make possible the preparation of solvent free coating compositions. This is a particularly desirable property since it makes possible the application of a thick protective coating in one application. In other words, a greater film thickness can be obtained from a single application than can be obtained with the usual coating compositions which contain relatively large amounts of solvent. The latter kind of compositions normally require multicoat operations to provide adequate film thickness.

The 2-vinyl-1,3-cyclic acetal-base film-formers, when employed as the sole film-former in a coating composition, generally fail, however, to give the desired uniform wetting and coverage of smooth surfaces such as tin plated metal, sheet steel, metal surfaces on automobile bodies and metal appliances, glass, and the like. This shortcoming, I have found, can be overcome, and other properties such as pigment wetting in the coating compositions and resistance to sagging of applied coatings improved, by including a thermosetting polymer in a coating composition containing such an acetal-base film-former.

The vinyl cyclic acetal-based film-forming compounds which are an essential film-forming ingredient of the coating compositions of the invention are those characterized by having linked together two or more 2-vinyl-1,3-cyclic acetal radicals represented by the formula

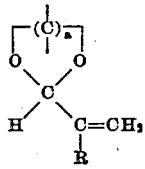

in which

represents carbon atoms in the ring (i.e., linking the two oxygen atoms), "$a$" is an integer greater than 1, preferably 2 or 3, all but one of the valences of said carbon atoms (i.e., $2a-1$ of the valences) are satisfied by monovalent radicals of the class consisting of hydrogen, alkyl, aryl, alkaryl, aralkyl, chloroalkyl, fluoroalkyl, alkoxyalkyl, cyano, chloroalkoxyalkyl, fluoroalkoxyalkyl, cyanoalkoxyalkyl, cyanoalkyl, alkenyl, chloroaryl and fluoroaryl when the value of "$a$" is 2, and consisting additionally of fluoro, chloro, acylamido and phenylsulfonyl when the value of "$a$" is greater than 2, and R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy. The sole valence of the

group not satisfied in the above definition is the valence through which the cyclic radical is connected to at least one other such radical by means of a polyvalent connecting radical.

The compounds described in the foregoing paragraph will for convenience be referred to hereinafter more briefly as the vinyl cyclic acetal film-formers. Those compounds and the method by which they are prepared are not a part of this invention and are disclosed and claimed in copending applications Serial No. 737,506, now U.S. 3,010,923, and Serial No. 737,507, now U.S. 3,010,918, filed by Carol K. Ikeda on May 26, 1958.

The polyvalent connecting radical which joins a plurality of the vinyl cyclic acetal radicals is not critical. It will be obvious to those skilled in the polymerization art, however, that constituents known to have an inhibiting effect on vinyl polymerization should be avoided or placed in a shielded or sterically hindered position so that the inhibiting effect is minimized. Likewise, strongly acidic radicals which tend to open the cyclic acetal ring, and radicals which form insoluble complexes with metallic driers are preferably avoided.

For reasons of economy, ease of operation, and availability of suitable starting materials, the preferred number of radicals in a given compound is 2 to 4 although compounds containing higher numbers of such radicals can be made. For example, six of such radicals can be attached to a hexavalent radical derived from mellitic acid.

From the standpoint of rapid air drying or insolubilization in the presence of oxygen, the preferred vinyl cyclic acetal film-formers are those in which the vinyl cyclic acetal equivalent does not exceed about 500; in other words, the weight of compound required to provide one gram mole of cyclic acetal radical does not exceed about 500 grams.

The preferred vinyl cyclic acetal film-formers are those in which the 2-vinyl-1,3-cyclic acetal groups are joined through ester linkages, that is, in which the linking radical is one provided by a polycarboxylic acid. Specific examples of such esters are bis(2-vinyl-1,3-dioxolane-4-butyl)-orthophthalate, bis(2-vinyl-1,3-dioxane-4-butyl)orthophthalate, bis(2-vinyl-1,3-dioxepane-4-butyl)orthophthalate, and homologues thereof in which the alkyl group instead of butyl is methyl, ethyl, propyl, or the like, and analogues which are the corresponding esters of isophthalic, terephthalic, tetrahydronaphthalic, adipic, sebacic, pyromellitic, tetrahydronaphthalene-1,2,6,7-tetracarboxylic, citric, itaconic, and maleic acids.

Other polyvalent radicals which can serve to link the 2-vinyl-1,3-cyclic acetal radicals to form the vinyl cyclic acetal film-former compounds used in the compositions of the invention are, for example, polyethyleneoxide radicals [—(OCH$_2$CH$_2$)$_n$—O—]; polymethylene radicals such as hexamethylene; the ortho-, meta-, or para-phenylene radicals; orthometallic ester radicals, for example,

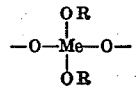

where R is an organic radical, preferably lower alkyl, and Me is a metal such as titanium, silicon, germanium, or tin; bisphenylolpropane radicals such as

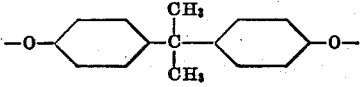

radicals such as —O—(CH$_2$)$_y$—O—.

The preferred vinyl cyclic acetal film-formers employed in the compositions of the invention are the liquid ones because they lend themselves to the easy preparation of solvent free or high solids (e.g., 60% and upwards) liquid coating compositions, a type especially desirable, because they permit the preparation of thick protective and decorative coatings with a minimum number of coating applications and because the cost and fire-hazard of solvents are elimniated by their use. However, the film-formers which are highly viscous or solid are readily soluble in solvents commonly used in liquid coating compositions and can be used by hot application techniques or in solution form.

A preferred method of preparing the vinyl cyclic acetal film-formers which are in the form of esters is to first prepare a hydroxy substituted 2-vinyl-1,3-cyclic acetal and then react that compound with a polycarboxylic acid ester under ester interchange conditions. For example, first acrolein or an alpha-substituted acrolein such as alpha-methacrolein, alpha-ethacrolein, alpha-phenylacrolein, alpha-chloroacrolein, alpha-cyanocrolein or alpha-carbethoxyacrolein can be reacted with a polyol such as glycerol, 1,2,6-hexenetriol, 1,4,7-heptanetriol, 1,3,5-pentanetriol, or 1,2,5-butanetriol in the presence of a catalytic amount of a mildly acidic compound such as an ammonium chloride or oxalic acid at a temperature of about 50 to 110° C. to yield, for example, a hydroxy substituted 2-vinyl-1,3-dioxolane, -dioxane, or dioxepane. Next, the hydroxy substituted compound is reacted with a lower alkyl ester of a polycarboxylic acid such as isophthalic acid, orthophthalic acid, terephthalic acid, sebacic acid, itaconic acid, maleic acid, pyromellitic acid, octahydronaphthalene dicarboxylicacid or the like at a temperature of about 50 to 250° C. in the presence of a basic catalyst such as an oxide, hydroxide, carbonate or alkoxide of an alkali or an alkaline earth metal.

Both of the aforementioned reactions are preferably carried out in a solvent which forms a binary with water or the alcohol by-products respectively in which case the binary is continuously distilled, separated, and the solvent is refluxed.

Vinyl cyclic acetal film-formers having a plurality of 2-vinyl-1,3-cyclic acetal groups connected by hydrocarbon or ether linkages can be prepared, for example, by reacting compounds such as 1,2,9,10-decanetetrol or diglycerol respectively with acrolein or an alpha-substituted acrolein under the conditions described above for preparing the hydroxy substituted 2-vinyl-1,3-cyclic acetals.

The foregoing and other methods for preparing the vinyl cyclic acetal film-formers are described more fully in the aforementioned applications Serial Nos. 737,506 and 737,507, both filed May 26, 1958, as are additional examples of such products.

The thermosetting polymer component which is an essential ingredient in the coating compositions of the invention can be varied widely and its chemical composition is not critical, keeping in mind, however, as will be apparent to one skilled in the art, that those thermosetting polymers which react with the drier components used in coating compositions or otherwise interfere with the drying process should be avoided. Illustrative of suitable thermosetting polymers are drying oil alkyd resins (the oil modifier in such resins may be long or short oil, and it can be for example, soya, linseed, china-wood, or dehydrated castor oil); nitrogen resins such as melamine aldehyde, urea aldehyde, and benzoguanamine aldehyde; polyurethane resins; polymeric epoxides; styrene/alkyl acrylate/methacrylic acid terpolymer in combination with a nitrogen resin such as those mentioned above; non-drying oil alkyds such as coconut oil modified alkyd in combination with a nitrogen resin; naturally occurring heat reactive gums; vinyl polymers having residual unsaturations such as poly(diallylphthalate), poly(allyloxyethylmethacrylate), glycidyl methacrylate polymerized through the epoxy group, polyesters of maleic acid, and meth- acrylated alkyd resins; and polynuclear hydrocarbon resins derived from aromatic hydrocarbons (i.e., naphthalene) and aldehydes (e.g. formaldehyde). Preferred are the oil modified alkyds, urea-formeldehyde and melamine-formaldehyde resins.

The proportions or weight ratios of vinyl cyclic acetal film-former to thermosetting resin used in formulating the coating compositions of this invention can be varied widely. In general, however the preferred compositions are those in which the acetal film-former is the predominant or principal film-forming constituent (i.e., it amounts to more than 50% of the total of acetal film-former and thermosetting resin present), and the thermosetting resin is present in minor or lesser amount. Still more preferred, in order to obtain the high solids coating compositions which are the preferred embodiment of the invention, the vinyl cyclic acetal film-former component will generally constitute from 75 to 99% by weight of the sum of the acetal film-former and thermosetting resin, and the thermosetting resin will constitute the remaining 25 to 1% by weight.

The coating compositions of the invention can contain conventional modifying agents in addition to the essential constituents of vinyl cyclic acetal film-former and thermosetting resin. Thus they can and will, unless a clear coating is desired, contain pigments, and they can also contain other conventional modifiers for coating compositions such as driers, anti-skinning agents, plasticizers, inhibitors, dispersing agents, flow-control agents, and the like.

Examples of the great variety of pigments which can be used are the iron blues, organic colors, metal flake pigments, and metal oxides, silicates, chromates, sulfides and sulfates. It will be understood by those in the coating art that the amount of pigment used is not critical except that it must be high enough to provide the desired hiding power. Thus the amount of pigment by weight based on the weight of the total film-forming material in the composition can vary, for example, between about 2% for light, high-hiding pigments such as carbon black or aluminum, and about 100% for heavy low hiding pigments such as lead chromate.

Driers are ordinarily used in the coating compositions. Illustrative of these are the commonly used salts or soaps of siccative metals such as cobalt, lead, iron, manganese, nickel, and copper. Such driers are commonly used in the art to speed up the drying and ultimate insolubilization of air drying coatings and they have a similar effect on the vinyl cyclic acetal film-formers used in the compositions of this invention. A particularly preferred drier metal is cobalt, for example, in the form of the acetate, naphthenate, linoleate, resinate, tallate, or octoate (2-ethylhexoate).

It is well known that the drying speed of air drying coatings can be increased not only by adding drier but also by heating, or a combination thereof. The drying, polymerization, or insolubilization of the coating compositions of this invention can likewise be hastened. Temperatures moderately above room temperature, for example, 100° to 150° F. hastens drying considerably, but where desirable for more rapid drying, coatings can be baked at higher temperatures, for example, 200° to 400° F. for short periods. Heating is generally desirable to cause the thermosetting polymer component of the composition to set suitably.

Examples of the volatile solvents and diluents which can be used in formulating the coating compositions of this invention if desired, or if necessary to solubilize the film-former, are toluene, xylene, butyl acetate, acetone, methyl isobutyl ketone, butyl alcohol, and other aliphatic or cycloaliphatic and aromatic hydrocarbons, esters, ethers, ketones, and alcohols such as are conventionally used in coating compositions.

The various ingredients can be brought together to form the compositions of this invention according to conventional methods for preparing organic coating compositions. Pigmented coating compositions of the invention can, for example, be prepared by dispersing the pigment in the thermosetting polymer, the vinyl cyclic acetal film-former, or a mixture of both by means of conventional paint grinding equipment. The solvents, diluents, and other modifiers used can be incorporated before, during or after the milling operation.

The liquid coating compositions of the invention can be applied to the substrate to be coated by any of the usual application methods such as spraying, dipping, brushing, roller coating, and knife coating. The coating compositions are especially useful for direct application to smooth surfaces such as those which commonly occur, for example, on sheet metal, glass, metal automobile bodies, metal household appliances and the like to provide protective or decorative coatings, but can also be applied over primer or undercoats, or in the patching, touching up, or refinishing of a previously coated article.

In order that the invention may be better understood, the following examples illustrating compositions of the invention, their preparation, application, and use are given in addition to the examples already given above. Parts and percentages are by weight unless otherwise indicated.

*Example 1*

This example illustrates a sprayable black enamel of 70% non-volatile content. The composition has a vinyl cyclic acetal to thermosetting polymer weight ratio of about 86/14. It is well suited for spray application to sheet metal, automobile bodies, and other metal surfaces to provide a decorative finish.

A mill base is prepared by grinding the following composition in a pebble mill.

| Composition A: | Parts |
|---|---|
| 55% solution of alkyd resin | 7.8 |
| Mineral spirits | 13.5 |
| High solvency petroleum naphtha | 3.4 |
| Carbon black | 12.9 |

The alkyd resin, referred to in Composition A above, is a 43% oil length glyceryl phthalate resin having an acid number of 6 and an unreacted hydroxyl content equal to 5% of glycerine. It is in solution in high solvency petroleum naphtha.

After grinding Composition A above in the pebble mill for about 24 hours, the following Composition B is added to the mill.

| Composition B: | Parts |
|---|---|
| Alkyd resin solution (same as in Composition A) | 39.2 |
| Mineral spirits | 22.5 |
| 10% cresol (inhibitor) dissolved in a 90/10 mixture of mineral spirits and petroleum naptha | 0.7 |

Compositions A and B are mixed in the pebble mill by grinding for 1,000 additional cycles to produce a mixture referred to herein as a mill base. The mill base is then intimately mixed with other components as described below to give Composition C.

| Composition C: | Parts |
|---|---|
| Mill base, as prepared above | 20.0 |
| Bis(2 - vinyl - 1,3-dioxolane - 4 - butyl)orthophthalate | 31.6 |
| Xylene | 3.3 |

To complete the coating composition from Composition C, there is added to that composition 0.8% of tertiary butyl hydroperoxide and cobalt butyl phthalate in amount sufficient to provide 0.05% Co++, each based on the weight of the bis(2-vinyl-1,3-dioxolane-4-butyl)orthophthalate component.

The resulting coating composition is sprayed on a phosphated steel panel and permitted to air dry. The coating dries overnight to a tack free film of 0.7–0.8 mil thickness. The film is attractive in appearance, being smooth and having a very high gloss. In addition, it is extremely adherent to the metal as illustrated by the fact that it can be bent on a ⅛ inch mandrel without cracking or lifting.

*Example 2*

This example illustrates a red enamel suitable for automotive finishes. It contains 65% non-volatiles by weight and has a vinyl cyclic acetal to thermosetting polymer weight ratio of 76/24.

A pigment dispersion or mill base is prepared using a conventional sand dispersing or sand grinding apparatus to provide an intimate mixture of the following ingredients.

| | |
|---|---|
| Solution containing 55% by weight alkyd resin | 29.0 |
| Toluidene red pigment (Du Pont Rt 386 D) | 24.0 |
| VM and P naphtha | 30.8 |
| 10% by weight cresol dissolved in 90/10 mixture of mineral spirits and petroleum naphtha | 30.8 |

The solvent for the alkyd resin, referred to in the above tabulation, is a high solvency petroleum naphtha. The alkyd resin is a 43% oil length glyceryl phthalate resin having an acid number of 6 and an unreacted hydroxyl content equal to 5% of glycerine.

To the pigment dispersion prepared as above, there is added an additional 16 parts of a 55% solution of alkyd resin of the same kind described above. The resulting mix is referred to below as mill base.

The mill base is mixed with other components, as described below, to give the coating composition of the invention:

| | |
|---|---|
| Mill base prepared as above | 40.0 |
| Bis(2-vinyl-1,3-dioxolane-4-butyl)orthophthalate | 28.4 |
| Xylene | 5.0 |

To the mixture of the components just tabulated there is added cobalt butyl phthalate in amount sufficient to provide 0.05% by weight Co++, based on the bis(2-vinyl-1,3 - dioxolane - 4 - butyl)orthophthalate component, and tertiary butyl hydroperoxide is added in amount corresponding to 0.8% by weight, based on the orthophthalate component.

The resulting coating composition is sprayed on a phosphated steel panel and permitted to air dry. The coating dries overnight to a tack free film having a thickness of about 1.0 mil. The resulting dried film presents an attractive, smooth, high gloss finish. It is resistant to cracking when subjected to impact and its extremely good adherence to the metal is illustrated by the fact that it can be bent on a ⅛ inch mandrel without cracking or lifting.

It is to be noted that the coating composition of this example, although containing toluidene red as the pigment, air dries very readily. This is surprising since it is well known that toluidene red normally inhibits drying of compositions which dry by oxidation mechanism.

*Example 3*

This example illustrates a sprayable enamel containing substantially 100% non-volatiles. The weight ratio of vinyl cyclic acetal film-former to thermosetting polymer in the composition is 90/10 and the pigment to binder ratio on a weight basis is 76/100.

To form the coating compositions of this example, the following ingredients are intimately mixed:

| | |
|---|---|
| Bis(2-vinyl-1,3-dioxolane-4-butyl) orthophthalate | 38.36 |
| 2-vinyl-1,3-dioxolane-4-butyl benzoate | 12.8 |
| Thermosetting polymer | 5.68 |
| Zinc oxide | 2.16 |
| Titanium dioxide | 41.0 |

There is added to the above mixture cobalt catalyst in the form of cobalt butyl phthalate in solution in amount sufficient to give a $Co^{++}$ content of 0.04% based on the total binder content (i.e., the sum of the benzoate, the phthalate and the thermosetting polymer).

The thermosetting polymer used in preparing the above coating composition is a polyester which is the reaction product of 1.6 moles of 2-vinyl-1,3-dioxolone-4-butanol and 1 mole of phthalic anhydride at 200–230° C. for 4 hours. The reaction is carried out in the presence of a small quantity of xylene which serves to carry over water of reaction by azeotropic distillation. The polyester thermosetting polymer is, as freshly prepared, a viscous sticky material at room temperature and has an acid number of 3.7.

The coating composition prepared as above is sprayed, while maintained at a temperature of about 90° C., through a spray gun maintained at a temperature of about 80° C. on to phosphated metal sheet. The resulting coating air dries overnight to one having a very high gloss and excellent resistance to impact, cracking and lifting.

If the thermosetting polymer is omitted from the composition of this example, there results a flocculent system which does not flow well when applied to a substrate.

*Example 4*

This example illustrates an enamel having rapid air drying characteristics and thus a composition of the kind particularly useful for touching up, patching, or refinishing automobile bodies in operations where heating or baking equipment is not available, or its use is impractical.

One part of bis(2-vinyl-1,3-dioxolane-4-butyl) itaconate and 3 parts of bis(2-vinyl-1,3-dioxolane-4-butyl) orthophthalate are added to 4 parts of a short oil soya alkyd resin mill base containing dispersed $TiO_2$ pigment. The composition of the mill base is

| | |
|---|---|
| Short oil soya alkyd resin | 15.1 |
| Titanium dioxide | 63.1 |
| Hydrocarbon solvent (B.P. 130–193° C.) | 21.8 |

The resulting pigmented composition contains a pigment to binder ratio of 55/100 by weight and was 89% solids. To this composition is added 0.1% by weight of cobalt drier (as $Co^{++}$) in the form of a solution of cobalt butyl phthalate in acetone.

The short oil soya alkyd resin used in the composition of this example is the same as that used in Example 1.

A film of the above composition is applied to a steel panel using a doctor blade with a 0.0033 inch clearance. The applied film air dries tack free in 3–3½ hours. It has excellent appearance, gloss, flexibility, and adhesion. It has a Tukon hardness of 5.0 Knoop units after 1 week. (ASTM Specification D–1474–57T).

*Example 5*

A mill base is prepared by initimately mixing the following components using a conventional sand milling procedure:

| | |
|---|---|
| Alkyd resin solution | 160 |
| Titanium dioxide | 631 |
| Xylene | 91 |
| Soya lecithin (50% solution in mineral spirits) | 15 |

The alkyd resin solution is a 60% by weight solution in xylene of an alkyd resin of 43% soya oil, 52% glyceryl phthalate, 5% excess glycerol.

The above mill base is intimately mixed with other ingredients as described hereinafter to provide a coating composition of this example.

| | |
|---|---|
| Mill base as prepared above | 20 |
| Bis(2-vinyl-1,3-dioxolane-4-butyl) orthophthalate | 12.4 |

Cobalt butyl phthalate in acetone is added to the last mentioned mix in quantity sufficient to provide about 0.015% $Co^{++}$ based on the weight of the orthophthalate compound.

The enamel prepared as above was applied to solvent-cleaned bright tin plate with a doctor blade set at 2.4 mil clearance, giving a dry film thickness of about 1.5 mil after baking at 125° C. for 10 minutes. The resulting dried coating on the tin plate is smooth and uniform and has an excellent balance of properties such as hardness, flexibility, and adhesion. In contrast, if the thermosetting polymer, i.e. the alkyd resin, is omitted, the resulting coating composition when applied to solvent-cleaned bright tin plate crawls into puddles thus providing spotty, uneven or "islands" of coating rather than the desired uniform coating.

*Example 6*

The following components are mixed:

| | |
|---|---|
| Bis(2 - vinyl-1,3-dioxolane-4-methyl) orthophthalate | 26.0 |
| Bis(2 - vinyl - 1,3 - dioxolane-4-butyl) orthophthalate | 12.0 |
| Thermosetting polymer | 2.5 |

Cobalt butyl phthalate in amount to provide 0.001% $Co^{++}$ based on the sum of the above three components.

The thermosetting polymer referred to in the tabulation is an 80% solution in toluene of a resin prepared by reacting 2 moles of 2-vinyl-1,3-dioxolane-4-methanol with 1 mole of phthalic anhydride, at about 200° C. for four hours, the solution having a Gardner-Holdt viscosity of Z2–Z3.

The coating composition prepared as above is clear and homogeneous, has a solids content of 90% and a Gardner-Holdt viscosity of C. A film of it cast on glass with a doctor blade set at 4.2 mil clearance, dried in air for 10 minutes, and then baked for 30 minutes at 225° C. is clear, colorless, smooth, and free of wrinkling, and is tough and very adherent to the glass. It has a hardness of 6.5 Knoop hardness unit, as determined by means of a Tukon hardness tester using a 25 gram weight on the diamond point. After aging 1 week at room temperature, the film has a hardness of 9.7 Knoop units and retains its toughness and excellent adhesion.

*Example 7*

The following components are intimately mixed:

| | |
|---|---|
| Bis(2-vinyl-1,3-dioxolane - 4 - methyl) orthophthalate | 21.0 |
| Bis(2 - vinyl - 1,3 - dioxolane-4-butyl) orthophthalate | 24.0 |
| Thermosetting polymer A | 17.5 |
| Thermosetting polymer B | 8.1 |

Cobalt butyl phthalate in amount to provide 0.01% by weight based on the sum of the above ingredients.

Thermosetting polymer A, referred to in the above tabulation, is a 60% solution of a short coconut oil, glyceryl phthalate, alkyd having an acid number of 8–11 and an excess hydroxyl content of 3.1% in a petroleum hydrocarbon fraction having a boiling range of 150–190° C., and an aniline point of −28° C., the solution having a Gardner-Holdt viscosity of Z1–Z3.

Thermosetting polymer B, referred to above, is a 55.5% solution in butanol, of unmodified butylated, melamine/formaldehyde resin containing 23–24% nitrogen and 32.5–34.5% combined formaldehyde, the solution having a Gardner-Holdt viscosity of L–V.

The above tabulated coating composition is a clear homogeneous solution having a solid content of 80% and a Gardner-Holdt viscosity of C. A film of it cast on glass with a doctor blade set at 4.2 mil clearance, dried in air for 10 minutes and then baked for 30 minutes at 225° F. is clear, colorless, smooth, and free of wrinkling, tough, flexible, and very adherent to the glass, and has a Tukon hardness of 5.6 Knoop units.

The hardness of the film, prepared according to this example, is about twice that expected from the hardness obtained separately from the vinyl cyclic acetal film-formers used in mixture and the coconut alkyd/melamine resin mixture.

Example 8

The following components are intimately mixed:

(1) N,N' - bis{[2-(α-methylvinyl)-1,3-dioxan-5-yl]methoxymethyl} urea _____ 25.6
(2) 2 - (α-methylvinyl)-1,3-dioxolane-4-butyl benzoate _____ 25.6
(3) Thermosetting polymer _____ 5.68
(4) Zinc oxide _____ 2.16
(5) Titanium dioxide _____ 41.0
(6) Cobalt butyl phthalate in amount to provide 0.01% by weight based on the sum of ingredients 1, 2 and 3 above.

The thermosetting polymer used in preparing the above coating composition is a polyester which is the reaction product of 1.6 moles of 2-vinyl-1,3-dioxolane-4-butanol and one mole of phthalic anhydride at 200–230° C. for 4 hours. The reaction is carried out in the presence of a small quantity of xylene which serves to carry over water of reaction by azeotropic distillation. The polyester thermosetting polymer is, as freshly prepared, a viscous sticky material at room temperature and has an acid number of 3.7. The coating composition prepared as above is sprayed while maintained at a temperature of about 90° C. through a spray gun maintained at a temperature of about 80° C. onto phosphated metal sheet. The film so applied is converted to a dry solid state by baking 30 minutes at 100° C. and gives a smooth, high gloss coating having excellent resistance to impact, cracking, and lifting.

Example 9

The following components are intimately mixed:

(1) Tris[ω - (2 - vinyl-1,3-dioxepan-4-yl) propyl] cyanurate _____ 25.6
(2) (2-vinyl - 1,3 - dioxolane-4-butyl)2'-cyanoethyl ether _____ 25.6
(3) Thermosetting polymer _____ 5.68
(4) Zinc oxide _____ 2.16
(5) Titanium dioxide _____ 41.0
(6) Cobalt butyl phthalate in amount to provide 0.01% by weight based on the sum of ingredients 1, 2 and 3 above.

The thermosetting polymer used in preparing the above coating composition is a polyester which is the reaction product of 1.6 moles of 2-vinyl-1,3-dioxolane-4-butanol and one mole of phthalic anhydride at 200–230° C. for 4 hours. The reaction is carried out in the presence of a small quantity of xylene which serves to carry over water of reaction by azeotropic distillation. The polyester thermosetting polymer is, as freshly prepared, a viscous sticky material at room temperature and has an acid number of 3.7.

The coating composition prepared as above is sprayed while maintained at a temperature of about 90° C. through a spray gun maintained at a temperature of about 80° C. onto phosphated metal sheet. The film so applied is converted to a dry solid state by baking 30 minutes at 100° C. and gives a smooth, high gloss coating having excellent resistance to impact, cracking, and lifting.

Example 10

The following components are intimately mixed:

(1) Bis[2-(α-methylvinyl) - 1,3-dioxolane-4-butyl]-terephthalate _____ 30
(2) 2-(α-methylvinyl)-1,3-dioxolane-4'-butyl benzoate _____ 15
(3) Thermosetting polymer A _____ 17.5
(4) Thermosetting polymer C _____ 8.1
(5) Titanium dioxide _____ 28.5
(6) Monastral Blue B pigment _____ 1.5
(7) Cobalt butyl phthalate in amount to provide 0.01% by weight based on the sum of ingredients 1, 2 and 3 above.

Thermosetting polymer A, used in the above composition, is the same thermosetting polymer as used in the composition of Example 3. Thermosetting polymer C used in the coating composition of this example is a 60% butanol solution (15–30 poises) of butylated urea-formaldehyde resin containing approximately 20% nitrogen, 42% combined formaldehyde, and 37% combined butanol (percentages based on solids).

The coating composition of this example is cast on a panel of phosphated steel with a doctor blade set at a 4.2 mil clearance and baked 30 minutes at 100° C. to give a glossy, hard, tough, pale blue film having excellent adhesion.

Example 11

The following components are intimately mixed following conventional paint mixed techniques:

G.
(1) Bis(2-vinyl-1,3-dioxolane-4-butyl) phthalate ___ 75
(2) Styrene/allyloxyethylacrylate copolymer (60/40) _____ 25
(3) Xylene _____ 25
(4) Titanium dioxide _____ 50
(5) Carbon black _____ 0.2
(6) Cobalt butyl phthalate in amount to provide 0.01% by weight based on the sum of ingredients 1 and 2 above.

The styrene/allyloxyethylacrylate copolymer component of the above coating composition is the thermosetting polymer component and is prepared by heating the mixture of the following components in an inert atmosphere at 60° C. for 24 hours:

Styrene _____ 60
β-Allyloxyethylacrylate _____ 40
Benzene _____ 400
α,α'-Azobisisobutyronitrile _____ 2

The coating composition of this example is sprayed onto a clean 20 gauge steel panel and baked 30 minutes at 150° C. to give a hard, glossy, xylene-insoluble coating.

Example 12

A vinyl cyclic acetal film-former is prepared by heating 2 moles of 2-vinyl-1,3-dioxolane-4-butanol and one mole of pyromellitic anhydride for 3 hours at about 100° C. to give a product consisting essentially of a compound having the following structure:

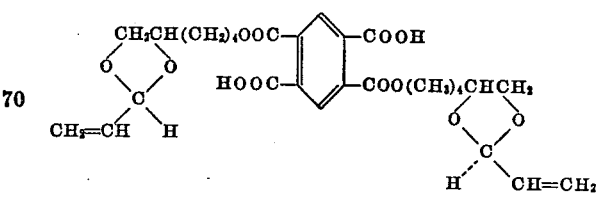

The vinyl cyclic acetal film-former prepared as above is formulated as follows to provide a thermohardening paint:

(1) Vinyl cyclic acetal film-former _____ 50
(2) Thermosetting polymer _____ 50
(3) Titanium dioxide _____ 80
(4) Xylene _____ 50
(5) Cobalt butyl phthalate in amount to provide 0.01% by weight based on the sum of ingredients 1 and 2 above.

The thermosetting polymer employed in the above paint composition is an epoxide obtained by reacting 2,2-diphenylolpropane with epichlorohydrin under alkaline conditions to give a viscous liquid having an epoxide equivalent of 190–210, a refractive index, $n_D^{20}$ of 1.573 and a Gardner-Holdt viscosity of Z–5 to Z–6, which product is current marketed by Shell Chemical Company under the proprietary name of "Epon" 828.

A film of the coating composition of this example is applied to steel panels and baked at 150° C. for 30 minutes to give hard, tough, flexible and glossy protective and decorative coatings.

This application is a continuation-in-part of my co-pending application S.N. 683,021, filed September 10, 1957, now abandoned.

The foregoing detailed description has been given for clearness of understanding only and no unnecessary limitations are to be understood therefrom. The invention is not limited to the exact details shown and described for obvious modifications will appear to those skilled in the art and any departure from the desecription herein which conforms to the principles of the invention is intended to be included in the scope of the claims below.

I claim:

1. A liquid coating composition adapted for application to smooth surfaces such as sheet metal, sheet glass, steel auto bodies, and the like which comprises as an essential film-forming component, in admixture with a thermosetting polymer inert toward any drying component in said coating composition, a compound having a plurality of radicals represented by the formula

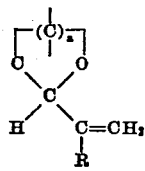

in which

represents carbon atoms in the ring, "$a$" is an integer greater than 1, all but one of the valences of said carbon atoms being satisfied by monovalent radicals of the class consisting of hydrogen, alkyl, aryl, alkaryl, aralkyl, chloroalkyl, fluoroalkyl, alkoxyalkyl, cyano, chloroalkoxyalkyl, fluoroalkoxyalkyl, cyanoalkoxyalkyl, cyanoalkyl, alkenyl, chloroaryl and fluoroaryl when the value of "$a$" is 2, and consisting additionally of fluoro, chloro, acylamido and phenylsulfonyl when the value of "$a$" is greater than 2, and R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy, said thermosetting polymer being selected from the group consisting of oil modified alkyd resins, melamine-aldehyde resins, urea-aldehyde resins, polymeric epoxide resins, styrene/allyloxy ethyl acrylate copolymer resins and polyesters of a phthalic acid and a 2-vinyl-1,3-dioxolane-4-alkanol.

2. A liquid coating composition of claim 1 in which the said essential film-forming component is a 2-vinyl-1,3-dioxolane-4-alkanol ester of a polycarboxylic acid and the weight ratios of said film-forming component to said thermosetting polymer in the coating composition is in the range of about 75:25 to 99:1.

3. An article having a smooth surface to which is adhered a coating obtained by drying on said surface a layer of a liquid coating composition of claim 1.

References Cited in the file of this patent

UNITED STATES PATENTS

| | | |
|---|---|---|
| 801,485 | Stephan et al. | Oct. 10, 1905 |
| 2,397,602 | Gresham | Apr. 2, 1946 |
| 2,401,776 | Rothrock | June 11, 1946 |
| 2,578,861 | Thomas et al. | Dec. 18, 1951 |
| 2,680,735 | Fegley et al. | June 8, 1954 |
| 2,729,650 | Habeshaw et al. | Jan. 3, 1956 |
| 2,902,476 | Kern et al. | Sept. 1, 1959 |

UNITED STATES PATENT OFFICE
CERTIFICATE OF CORRECTION

Patent No. 3,058,934            October 16, 1962

Carol K. Ikeda

It is hereby certified that error appears in the above numbered patent requiring correction and that the said Letters Patent should read as corrected below.

Column 2, line 72, before "radicals" insert -- and ether forming --; column 3, line 24, for "1,2,5-butanetriol" read -- 1,2,4-butanetriol --; column 7, line 8, for "dioxolone" read -- dioxolane --; column 10, lines 67 to 74, the formula should appear as shown below instead of as in the patent:

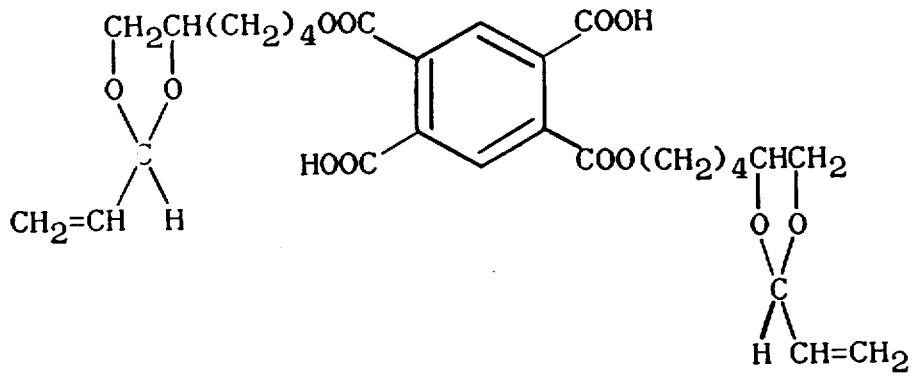

Signed and sealed this 19th day of March 1963.

(SEAL)
Attest:

ESTON G. JOHNSON
Attesting Officer

DAVID L. LADD
Commissioner of Patents